United States Patent [19]

Berkey

[11] Patent Number: 5,044,716
[45] Date of Patent: Sep. 3, 1991

[54] CHLORINE-DOPED OPTICAL COMPONENT

[75] Inventor: George E. Berkey, Pine City, N.Y.

[73] Assignee: Corning Incorporated, Corning, N.Y.

[21] Appl. No.: 447,796

[22] Filed: Dec. 8, 1989

[51] Int. Cl.$^5$ .............................................. G02B 6/26
[52] U.S. Cl. ........................................ 385/51; 385/43; 385/144
[58] Field of Search ................. 350/96.15, 96.29, 96.34

[56] References Cited

U.S. PATENT DOCUMENTS

| 4,735,475 | 4/1988 | Watanabe et al. | 350/96.34 |
| 4,798,436 | 1/1989 | Mortimore | 350/320 X |
| 4,822,136 | 4/1989 | Hicks, Jr. | 350/96.34 |
| 4,830,463 | 5/1989 | Lemaire et al. | 350/96.34 |
| 4,877,300 | 10/1989 | Newhouse et al. | 350/96.15 |

Primary Examiner—John D. Lee
Assistant Examiner—Stephen W. Barns
Attorney, Agent, or Firm—William J. Simmons, Jr.

[57] ABSTRACT

A fiber optic coupler of the type wherein first and second single-mode optical fibers, each having a core and a cladding, are fused together along a portion of the lengths thereof to form a coupling region. The fiber diameters are smaller in the coupling region than in the remainder of the fibers. The cladding of the second fiber contains an amount of chlorine sufficient to increase the refractive index $n_2'$ thereof to a value greater than the refractive index $n_2$ of the cladding of the first fiber.

30 Claims, 5 Drawing Sheets

CHLORINE-DOPED OPTICAL COMPONENT

CROSS-REFERENCE TO RELATED APPLICATION

This application is related to U.S. patent application Ser. No. 07/447,808 (Miller et al. 3-3-2-2) entitled "Achromatic Fiber Optic Coupler" filed on even date herewith.

BACKGROUND OF THE INVENTION

This invention relates to passive optical components containing chlorine-doped regions, and more particularly, to fiber optic couplers incorporating optical fibers or paths wherein chlorine-doped regions are at least partially responsible for a difference in propagation constants in the optical paths.

Coupling can occur between two closely spaced cores or optical paths in passive optical devices. Such devices exist in the form of fused fibers, overclad fused fibers, planar devices and the like. Fused fiber devices are disclosed in U.S. Pat. Nos. 4,798,436 (Mortimore) and 4,822,126 (Sweeney et al.) and in the publication: O. Parriaux et al., "Wavelength Selective Distributed Coupling Between Single Mode Optical Fibers for Multiplexing", Journal of Optical Communications, Vol. 2, No. 3, pp. 105-109. Overclad fiber optic couplers are disclosed in European published patent application No. 0302745 and in said related U.S. patent application Ser. No. 07/447,808. Examples of planar passive devices can be found in U.S. Pat. Nos. 3,957,341 (Taylor) and 4,765,702 (Dohan et al).

In the discussion of passive devices having regions of different refractive index, the relative refractive index difference $\Delta_{a-b}$ between two materials with refractive indices $n_a$ and $n_b$ is defined as $$\Delta_{a-b} = (n_a^2 - n_b^2)/2n_a^2 \qquad (1)$$

For simplicity of expression, $\Delta$ is often expressed in percent, i.e. one hundred times $\Delta$.

Couplers exhibiting diverse spectral coupling characteristics such as achromaticity, narrow band wavelength division multiplexing (WDM) and the like, can be formed from optical paths or fibers having different propagation constants. The aforementioned patents and publications teach that two optical paths can be provided with a $\Delta\beta$, i.e. a difference in propagation constants, by providing the core and/or cladding portions of those paths with different cross-sectional areas or different refractive index profiles.

Certain of the aforementioned coupling effects can be achieved by employing fibers having slightly different cladding refractive indices. This cladding refractive index difference can be the sole effect employed to obtain a $\Delta\beta$ between the fibers, or it can be utilized in combination with one or more other effects that change propagation constant. This index difference can be characterized in terms of $\Delta_{clads}$, the value of which is obtained by substituting the cladding index $n_2$ of one fiber and the cladding index $n'_2$ of the other fiber for $n_a$ and $n_b$, respectively, of equation (1) and solving for $\Delta$. The required value of $\Delta_{clads}$ can be obtained by adding a dopant to the cladding of only one of the fibers or by adding different amounts of the same or different dopants to the claddings of the two fibers. Certain devices, such as the achromatic overclad coupler disclosed in said related U S patent application Ser. No. 07/447,808, require a very small value of $\Delta_{clads}$, namely less than 0.03%, to obtain the desired value of $\Delta\beta$. Heretofore, it has been conventional practice to employ silica as the base glass and to employ dopants such as fluorine or $B_2O_3$ to lower the refractive index or to employ $GeO_2$, $P_2O_5$ or the like to increase the refractive index of the base glass. When a relatively low value of $\Delta_{clads}$ is required to obtain the desired value of $\Delta\beta$, it has been difficult to employ dopants such as $B_2O_3$, fluorine, $GeO_2$ and the like since they have a relatively large effect on refractive index. It is therefore difficult to deliver such dopants in the small, precisely controlled amounts that are necessary to change the refractive index of the base glass to an extent sufficient to provide such small values of $\Delta_{clads}$.

SUMMARY OF THE INVENTION

An object of this invention is to provide a simple, accurate method of modifying the refractive index of a region of an optical device. Another object is to provide a passive optical device wherein at least one region thereof is formed of a base glass containing a dopant having a very minor effect on refractive index. Yet another object is to provide an optical device wherein the mechanism for changing the propagation constant of an optical path thereof has negligible effect on the mode field diameter thereof. A further object is to provide a single-mode fiber optic coupler, the connection pigtails of which can be coupled with low insertion loss to system fibers. Yet another object is to provide a single-mode achromatic fiber optic coupler that is characterized by a very small change in coupled power over a wide band of wavelengths.

The present invention broadly relates to a passive optical component having adjacent regions of transparent material. Such components exist in the form of fused fibers, overclad fused fibers, planar devices and the like. At least one region of the component contains an amount of chlorine sufficient to alter the optical performance thereof. The adjacent regions may include at least first and second adjacent optical waveguide paths, each of which includes a light propagation region and at least one adjacent region of refractive index that is lower than that of the light propagation region. In accordance with the invention, the adjacent region of the second path contains an amount of chlorine sufficient to increase the refractive index $n'_2$ thereof to a value greater than the refractive index $n_2$ of the adjacent region of the first path the difference between $n_2$ and $n'_2$ being at least partially responsible for a difference in propagation constants between the first and second paths. The adjacent region of the first path can be chlorine-free, or it can contain chlorine.

The adjacent region of the second optical path can be formed by depositing a layer of glass particles, subjecting the particles to a chlorine-containing atmosphere, and consolidating the particles to form a chlorine-containing glass. If the adjacent region of the first path has been formed by a similar method in which deposited glass particles have been dried in a chlorine-containing atmosphere, the particles employed in the formation of the second path must be subjected to an amount of chlorine greater than the amount necessary to remove water from the particles.

One embodiment of the invention concerns a fiber optic coupler comprising at least first and second optical fibers, each having a core and a cladding. The fibers are fused together along a portion of the lengths thereof to form a coupling region wherein at least a portion of an optical signal propagating in the first fiber is coupled to the second fiber. The cladding of the second fiber contains an amount of chlorine sufficient to increase the refractive index $n'_2$ thereof to a value greater than the refractive index $n_2$ of the cladding of the first fiber. The difference between $n_2$ and $n'_2$ is at least partially responsible for a difference in propagation constants between the first and second fibers.

The cladding of the first fiber may contain a residual amount of chlorine, usually at least 0.04 wt. %, resulting from a process employed for drying the cladding. For certain applications, the fibers are identical except: for the difference in concentrations of chlorine in the claddings thereof. Other applications require that the fibers also differ in other respects in order to obtain the required difference in propagation constants and/or spectral characteristics.

One embodiment of the invention pertains to an overclad fiber optic coupler which includes an elongated body of matrix glass having a refractive index $n_3$. At least first and second optical fibers extend longitudinally through the elongated body. Each of the fibers includes a core surrounded by a cladding of refractive index less than that of the core but greater than $n_3$. The cladding of the second fiber contains an amount of chlorine sufficient to increase the refractive index $n'_2$ thereof to a value greater than the refractive index $n_2$ of the cladding of the first fiber. The fibers are fused together along with the midregion of the matrix glass body. The diameter of the central portion of the midregion and the diameters of the optical fibers in the central portion are smaller than the diameters thereof at the endfaces of the body, and the cores of the optical fibers are more closely spaced at the central region than at the endfaces to form a coupling region wherein a portion of an optical signal propagating in one of the fibers is coupled to the other of the fibers.

In a specific embodiment wherein the coupler possesses achromatic properties, the difference between the refractive indices $n_2$ and $n'_2$ is such that insertion loss is less than 4 dB in each leg thereof over a 300 nm range of wavelengths up to 1565 nm. The difference between the refractive indices of the claddings of the first and second fibers of this type of coupler is such that the value of $\Delta_{clads}$ is greater than zero but less than 0.03%, wherein $\Delta_{clads}$ equals $(n_2^2 - n'^2_2)/2n_2^2$. To form 3 dB couplers, the value of $\Delta_{clads}$ should be less than about 0.025%.

Fused fiber couplers and overclad couplers can be formed by providing at least two glass optical fibers, each of which comprises a core surrounded by a cladding having a refractive index lower than that of the core. The cladding of a second of the fibers contains an amount of chlorine sufficient to increase the refractive index $n'_2$ thereof to a value greater than the refractive index $n_2$ of the cladding of a first of the fibers. Portions of the fibers are disposed in side-by-side relationship and are heated to cause the predetermined portions to fuse together into a unitary region. Axial tension can be applied to the fused unitary region to form an elongated coupling region of reduced diameter.

To form an overclad coupler, the fiber portions that are to be fused can be inserted into the aperture of a glass tube having a refractive index lower than that of the claddings of the fibers. The step of heating results in the collapse of the tube onto the fibers.

The second fiber can be formed by depositing a coating of glass particles on a glass rod which ultimately forms the central portion of the fiber. The coating is subjected to an atmosphere containing chlorine, and the coating is consolidated on the rod to form a second draw blank from which the second fiber is drawn.

It is often desirable to form the first fiber by a technique that results in the retention of a small amount of chlorine in the cladding. More specifically, the first fiber can be formed by depositing a coating of glass particles on a glass rod, subjecting the coating to an atmosphere containing a given concentration of chlorine that is sufficient to dry the coating, and consolidating the coating on the rod to form a first draw blank from which the first fiber is drawn. When the first fiber contains residual chlorine resulting from the drying process, the coating particles deposited in the formation of the second draw blank is subjected to an atmosphere containing a concentration of chlorine that is greater than the given concentration. Conventional fiber drying processes result in the retention of between about 0.04 wt. % and 0.1 wt. % chlorine in the cladding of the first fiber.

A usual requirement for certain fiber optic couplers is that the fibers extending therefrom, referred to herein as "pigtails", be compatible with standard system fibers to which they will be connected in order to minimize connection loss. For example, the outside diameter and the mode field diameter of the coupler pigtails should be substantially the same as those of a standard fiber. One of the fibers employed in the fabrication of the achromatic overclad coupler can be a standard, commercially available fiber. It is an advantage of the present invention that the incorporation into the cladding of the second fiber of sufficient chlorine to provide a $\Delta_{clads}$ value less than 0.03% results in substantially no change in the mode field diameter of the second fiber relative to that of the first fiber.

DESCRIPTION OF THE PREFERRED EMBODIMENTS

The drawings are not intended to indicate scale or relative proportions of the elements shown therein.

Figure 1:
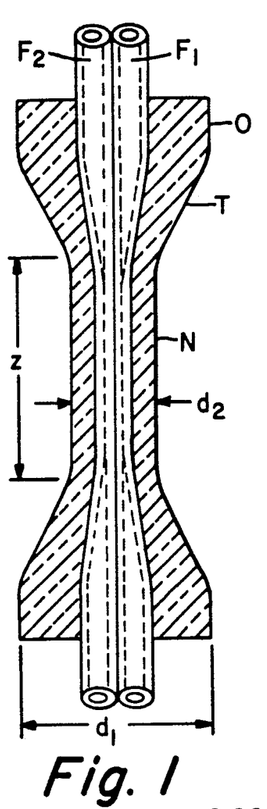
FIG. 1 is a cross-sectional view of an overclad coupler.

In the embodiment shown in FIG. 1, each of the optical fibers $F_1$ and $F_2$ has a core of refractive index $n_1$ surrounded by cladding of refractive index lower than $n_1$. The claddings of fibers $F_1$ and $F_2$ have different refractive indices $n_2$ and $n'_2$, respectively, the values of which are such that the propagation constants of those fibers differ to the extent necessary to provide achromaticity.

To form the device of FIG. 1, a coupler preform is formed by threading fibers $F_1$ and $F_2$ through glass overclad tube O, the refractive index $n_3$ of which is less than the refractive indices of the fiber claddings. Whereas those portions of the fibers extending from the tube preferably have protective coating material (not shown in this illustrative embodiment), those portions thereof within the tube have no coating. The original diameter of the tube is $d_1$. The midregion of the coupler preform is evacuated and heated to collapse it onto the fibers. The tube is reheated and the ends thereof are pulled in opposite directions to increase the tube length and reduce its diameter. The combined rate at which the two tube ends move away from each other constitutes the stretch rate. The central portion of the stretched midregion constitutes neckdown region N of diameter $d_2$ where the fiber cores are sufficiently closely spaced for a sufficiently long distance z to effect the desired coupling therebetween. Region N is illustrated as having a constant diameter even though a slight taper exists therein, whereby the longitudinal center of section N exhibits the minimum diameter. Draw ratio R, which is equal to $d_1/d_2$, is a critical parameter in determining the optical characteristics of the particular device being made. A preferred range of draw ratios for achromatic overclad couplers is between about 3:1 and 10:1 depending upon the value of $\Delta_{clads}$ and the amount of power to be coupled. Tapered regions T connect the neckdown region with the unstretched end regions of tube O. The duration of the heating period for the stretch step is shorter than that for the tube collapse step; only the central portion of the midregion is stretched.

It is conventional practice to monitor output signals to control process steps in the manufacture of optical devices as evidenced by U.S. Pat. Nos. 4,392,712 and 4,726,643, 4,798,436, U.K. patent application No. GB 2,183,866 A and International Publication No. WO 84/04822. Furthermore, computers are often employed in feedback systems which automatically perform such monitor and control functions. A suitably programmed Digital PDP 11-73 micro-computer can be utilized to perform these functions. During the tube collapse and stretch steps, the ends of the tube are affixed to computer controlled stages. The amount of stretching to which the tube must be subjected to achieve given characteristics is initially determined by injecting light energy into the input fiber of a coupler preform and monitoring the output power at one or more of the output fibers during the stretch operation. If a 2×2 coupler is being formed, a light source can be connected to an input end of the first and second fibers, and a detector can be aligned with the output ends thereof, the fibers being manipulated to maximize the output power coupled to each detector. During stretching, the input end of only the first fiber is connected to a source, and the output ends of both fibers are monitored. The detection of a predetermined ratio of powers at the outputs of the first and second fibers can be used as an interrupt to cause the computer controlled stages to stop pulling the sample. If a 1×2 coupler is being formed, the second fiber cannot be accurately positioned with respect to certain detectors until some light is coupled thereto from the first fiber. An achromatic coupler can be made by monitoring only the output from the first fiber. When the output from the first fiber drops to a predetermined value, the system is instructed to stop stretching. An alternative procedure for monitoring 1×2 couplers is described below.

After having determined the proper stretching distance to achieve predetermined coupling characteristics, the apparatus can be programmed to move the stages that proper stretching distance during the fabrication of subsequent couplers that are to have said predetermined characteristics. The timing sequences that have been used in the fabrication of a particular type of coupler can be entered in a separate multiple command file that the computer recalls at run-time. The collapse and stretch steps that are required to make that particular coupler can be executed in succession by the computer on each coupler preform to reproducibly manufacture couplers. The process parameters that can be controlled by the computer to ensure coupler reproducibility are heating times and temperatures, gas flow rates, and the rate or rates at which the stages pull and stretch the coupler preform.

If the device that is being made is a 3 dB coupler, for example, the stretching operation is not stopped when the output power from the two fibers is equal. Various parts of the system exhibit momentum, whereby stretching of the coupler preform continues after the stage motors are instructed to stop. The coupling ratio therefore changes after the stopping signal is generated. Also, the coupling characteristics may change as a newly formed coupler cools down. Experiments can be performed on a particular type of coupler to determine that coupling ratio which must be used to generate the interrupt signal in order to achieve a predetermined coupling ratio after the device cools.

Following are examples of the various stretching operations that can be performed.

A. Heat the coupler preform, and stretch it at a single rate until a predetermined coupling has been achieved.

B. After subjecting the coupler preform to a single heating step, stretching it at differing stretch rates until a predetermined coupling has been achieved. Two or more discrete stretch rates could be employed, or the stretch rate could continually vary with respect to time. This stretching technique has been employed to tune the power transfer characteristic, i.e. the amount of power transferred from the input fiber to the output fiber during the first power transfer cycle of the coupler preform stretching operation.

C. Heat the coupler preform and perform a first stretch which does not achieve the predetermined coupling; reheat the resultant device and perform a second stretch. The heat and reheat steps may be performed at a single temperature or at different temperatures. The first and second stretch steps can be done at the same stretch rate or at different stretch rates. More than two heat and stretch steps could be performed.

A species of stretching embodiment C is especially useful in the formation of 1×2 couplers. The stretching operation is temporarily terminated after some minimal amount of power has been coupled to the second fiber. For example, stretching could be stopped after the coupler preform has been stretched some predetermined distance, such as between 90% and 99% of the total distance required to achieve the final coupling ratio. The second fiber can be connected to a detector, and the power coupled to that detector can be maximized. Thereafter, a second stretching operation can be initiated, the interrupt signal being based on the ratio of the two output signals. The second stretching operation is preferably conducted at a final stretch rate that is lower than the initial stretch rate. Also, during the second stretch, it is preferable to employ a flame which has a lower temperature and/or which is less focused than the flame employed during the first stretch.

Tube O can be characterized by the symbol $\Delta_{2-3}$, the value of which is obtained by substituting $n_2$ and $n_3$ into equation (1). Commercially available single-mode optical fibers usually have a value of $n_2$ that is equal to or near that of silica. If silica is employed as the base glass for the tube, a dopant is added thereto for the purpose of decreasing the tube refractive index $n_3$ to a value lower than $n_2$. In addition to lowering the refractive index of the tube, the dopant $B_2O_3$ also advantageously lowers the softening point temperature thereof to a value lower than that of the fibers. This enhances to a certain extent the collapsing of the tube onto the fibers; the tube glass flows around the fibers without distorting their shape. For certain purposes it may be desirable to employ a tube glass that is sufficiently hard that the tube slightly flattens the fibers as it forces the fibers together. Fluorine can also be employed to lower the tube refractive index. Suitable tube compositions are $SiO_2$ doped with 1 to 25 wt. % $B_2O_3$, $SiO_2$ doped with 0.1 to approximately 2.5 wt. % fluorine, and $SiO_2$ doped with combinations of $B_2O_3$ and fluorine. When $\Delta_{2-3}$ is below about 0.2%, the amount of $B_2O_3$ in a silica tube is insufficient to soften the tube glass, whereby it excessively deforms the fibers during the collapse step. The value of $\Delta_{2-3}$ for standard couplers has therefore usually been between 0.26% and 0.35%. Suitable achromatic overclad couplers have been made from preforms comprising tube and fibers exhibiting refractive index values such that $\Delta_{2-3}$ is within that range. However, process reproducibility is enhanced by employing preforms having $\Delta_{2-3}$ values above that previously employed range.

Figure 2:
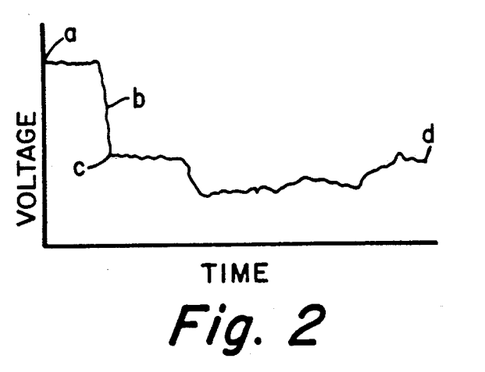
FIGS. 2 and 3 are graphs of output voltage v. Stretching time for couplers having two different overclad refractive indices.
Figure 3:
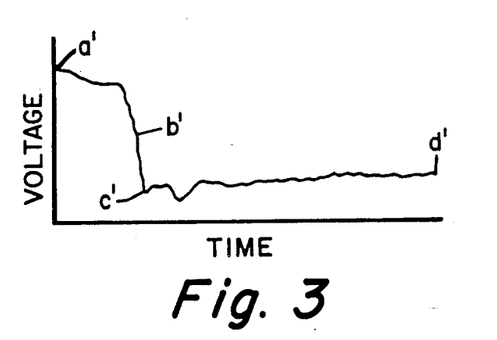

To demonstrate the effect of the overclad glass, reference is made to FIGS. 2 and 3 which are plots of the voltage from a detector connected to the output end of the input fiber during the manufacture of 1×2 couplers wherein the values of $\Delta_{2-3}$ are 0.36% and 0.48%, respectively. Referring to FIG. 2, the output is initially highest at point a since coupling has not yet occurred. As the stretching process is initiated and power begins to couple, the power remaining in the input fiber begins to decrease at some point in time after point a. At point b, the detected power is such that the computer controlled stages are instructed to stop moving. A few microseconds later, the stretching step is terminated (point c), and the finished coupler begins to cool. During cooling, the coupled power begins to vary until it finally stabilizes at point d when it is sufficiently cool that there is no further change in stress or refractive index within the coupler. It is possible, by experimentation, to form a coupler, the 3 dB point of which is within 10 nm of the desired wavelength by causing the stretching operation to stop at some predetermined coupling other than 50%.

The meandering of the coupling ratio upon cooling of the coupler can be essentially eliminated by utilizing overclad tubes of sufficiently high refractive index that the value of $\Delta_{2-3}$ is greater than about 0.4%. This stabilizing effect is illustrated in FIG. 3 wherein reference letters similar to those of FIG. 2 are represented by primed reference numerals. The amount of coupled power begins to decrease at point a', the computer controlled stages stop moving at point b', and the stretching step is terminated at point c'. During cooling, the coupled power varies only slightly until it stabilizes at point d'. After the stretching has stopped (points c and c'), the coupled power will more predictably reach point d' than point d.

A theoretical analysis was made of 3 dB couplers of the type wherein $\Delta\beta$ was obtained by fiber cladding index difference. Coupled mode theory was used to model the behavior of the achromatic couplers [A. W. Snyder and J. D. Love, *Optical Waveguide Theory*, Chapman and Hall, New York, 1983]. In accordance with this theory, the mode field of the overclad coupler is assumed to be a linear combination of the fundamental modes $\psi_1$ and $\psi_2$ of each of the fibers $F_1$ and $F_2$ in the absence of the other fiber, i.e. with the fiber surrounded by overclad index $n_3$ only. The mode fields and propagation constants can be determined exactly for such a structure [M. J. Adams, *An Introduction to Optical Waveguides*].

The coupling constant which describes the optical coupling between the two cores can then be written as an overlap integral:

$$C = \int \psi_1(r)\psi_2(r')(n-n')dA \qquad (2)$$

In this equation, $\psi_1$ and $\psi_2$ are the mode fields of the two cores, r and r' are the radial distances from the center of the cores of fibers $F_1$ and $F_2$, respectively, n is the index structure of the entire coupler, n' is the index structure with the core of $F_1$ replaced by overcladding material of index $n_3$, and the integral is over the entire cross-section of the coupler (but $n-n'$ is only non-zero over the core and cladding of fiber $F_1$). The mode fields are assumed to be normalized in this equation, i.e. the integrals $\int \psi_1^2 dA$ and $\int \psi_2^2 dA$ both equal 1.

While these are tapered devices, their behavior is adequately modeled by assuming a constant draw ratio over a given coupling length, with no coupling outside this length, i.e. assuming that the diameter of region N of FIG. 1 is constant over the entire length z. This approximation works well since the coupling constant is a rapidly increasing function of draw ratio, and thus the behavior of a coupler is dominated by the behavior at the highest draw ratio. Using this approximation, with the power launched into core 1, then, as a function of z, the length along the coupler axis, the power in the two cores is given by $$P_1(z) = 1 - F^2 \sin^2(Cz/F) \quad (3)$$

and $$P_2(z) = F^2 \sin^2(Cz/F) \quad (4)$$

where the factor F is given by $$F = \left[1 + \left(\frac{\beta_1 - \beta_2}{2C}\right)^2\right]^{-1/2} \quad (5)$$

where $\beta_1$ and $\beta_2$ are the propagation constants of fibers $F_1$ and $F_2$, respectively.

Optimal achromatic performance was defined, for a single-window device having a center wavelength of 1310 nm and a width of 50 nm, as being the point where $$P_2(1297.5 \text{ nm}) = P_2(1322.5 \text{ nm}) = 0.5 \quad (6)$$

The achromaticity was defined as $$\text{Achromaticity} = \frac{P_2(1335 \text{ nm}) - P_2(1310 \text{ nm})}{25 \text{ nm}} \quad (7)$$

The coupled mode model was used to determine a suitable range of $\Delta_{clads}$. Most of the assumptions which were made concerning coupler parameters are based on work done on standard overclad couplers. Fiber $F_1$ was assumed to be a standard 125 μm outside diameter single-mode fiber having a core radius of 4 μm. The core and cladding refractive indices $n_1$ and $n_2$ were assumed to be 1.461000 and 1.455438, respectively. It was assumed that fiber $F_2$ was identical to fiber $F_1$ except that the cladding index $n'_2$ was greater than $n_2$. The value of $\Delta_{2-3}$ was assumed to be 0.3%. In order to determine the combination of draw ratio and length z for which achromaticity was best, $P_2$ was calculated at the appropriate wavelengths for a range of draw ratios. The combination of draw ratio and coupling length z which satisfied equation (6) was determined, and then the achromaticity (the variation in coupled power in percent per nanometer) calculated for that combination.

Figure 4:
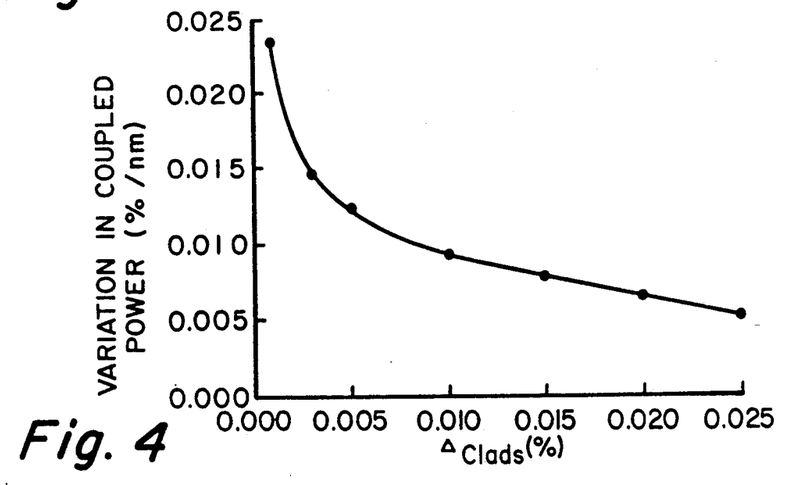
FIG. 4 is a graph of the coupled power slope (centered around 1310 nm) plotted as a function of $\Delta_{clads}$.

As shown in FIG. 4, the theoretical analysis revealed that the variation in coupled power (at 1310 nm) increases as the value of $\Delta_{clads}$ decreases. This is in accordance with the expected relationship whereby coupler achromaticity decreases as the difference between the fiber propagation constants decreases. The relationship shown in FIG. 4 is for couplers having a $\Delta_{2-3}$ value of 0.3%. For couplers having greater values of $\Delta_{2-3}$, the curve is displaced toward higher values of variation in percent coupled power. When the value of $\Delta_{clads}$ is less than 0.005%, the variation in percent coupled power rapidly increases. The achromaticitY therefore rapidly decreases at values of $\Delta_{clads}$ below this value. Also, as the value of $\Delta_{clads}$ decreases below 0.005%, the required length of the neckdown region increases to such an extent that the resultant achromatic coupler would be impractical in that it would be undesirably long and would be difficult to make.

Figure 5:
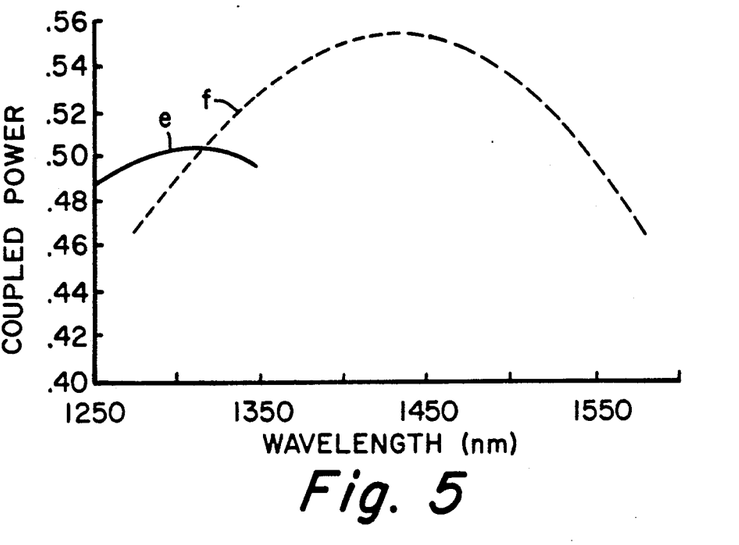
FIG. 5 shows theoretical spectral response curves for single-window and double-window achromatic couplers wherein $\Delta_{clads}$ is 0.005%.

FIG. 5 shows the theoretical relationship of coupled power with respect to wavelength for both single-window and double-window couplers, with $\Delta_{clads} = 0.005\%$ and $\Delta_{2-3} = 0.3\%$. The value of $d_1/d_2$ is 6.6 for the single-window device as determined by requiring equation (6) to be satisfied. The value of $d_1/d_2$ is 6.2 for the double-window device as determined by requiring an analogous equation to be satisfied for the wavelengths 1310 nm and 1550 nm.

Whereas the model indicated that a draw ratio of about 6:1 would be needed to form a coupler wherein $\Delta_{clads}$ is 0.005%, 3 dB achromatic couplers having low values of $\Delta_{clads}$ have been made having draw ratios as low as about 3.5:1. The draw ratio can be even lower for taps (less than 50% coupling) since less stretching is required. As the value of $\Delta_{clads}$ increases, the draw ratio must increase in order to achieve the desired coupling ratio. Although FIG. 4 would seem to suggest that a $\Delta_{clads}$ value of 0.025% would be desirable from the standpoint of providing very good achromaticity, such a coupler is difficult to make since the draw ratio required to make it is around 10:1. Also, for reasons discussed below, the coupled power at higher values of $\Delta_{clads}$ may be inadequate to achieve the desired coupling ratio.

Figure 6:
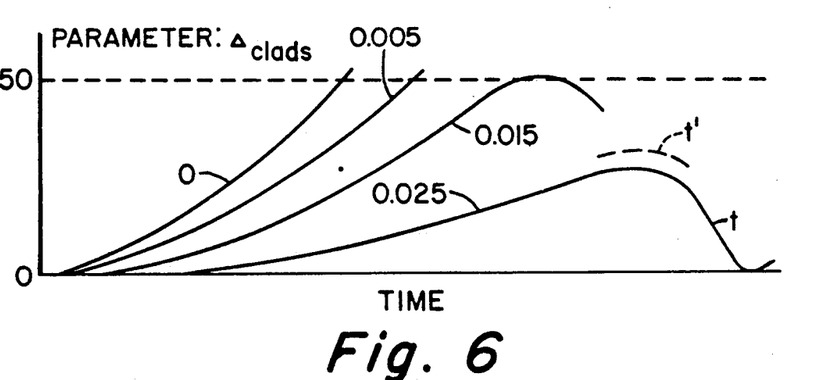
FIG. 6 is a graph which schematically illustrates the temporal variation in percent coupled power during the stretching of couplers having different values of $\Delta_{clads}$.

While a coupler preform is being stretched to form a coupler, the diameter of neckdown region N becomes smaller with increasing time. FIG. 6 shows that the coupled power varies during the stretching process. The curves of FIG. 6 do not bear an exact relationship with respect to one another; rather, it is intended that they qualitatively illustrate the relative relationship between the temporal coupled power curves of couplers having different $\Delta_{clads}$ values. During the stretching of a standard coupler ($\Delta_{clads} = 0$), the coupled power relatively quickly reaches 50% and eventually reaches almost 100%. During the stretching of devices having greater values of $\Delta_{clads}$, greater time periods are required to achieve 50% coupling, and the maximum possible amount of coupled power decreases. For a given set of stretching conditions including rate of stretch, temperature of the coupler preform, and the like, there will be a value of $\Delta_{clads}$ for which the coupled power just reaches 50% on the first peak of the coupled power curve. For a given set of draw conditions, this value of $\Delta_{clads}$ is shown in FIG. 6 to be 0.015%. For higher values of $\Delta_{clads}$, such as 0.025%, the first power transfer peak of the coupled power curve cannot provide 50% coupling. However, it can be seen that a device for coupling less than half the input power, for example a 10% tap, might easily be made by stretching a coupler preform having a $\Delta_{clads}$ value of 0.025% until the coupled power is 10%, a value that can be attained on the first peak.

The curves of FIG. 6 are not continued in time any further than the extent necessary to illustrate the specific point being discussed. The first power transfer peak is shown for couplers wherein $\Delta_{clads}$ is 0.015 and 0.025. Subsequent power transfer peaks are not shown. However, if the coupler preforms were stretched for longer periods of time, the coupled power would continue to oscillate between zero and some maximum value, the period of each subsequent oscillation being narrower than the previous one. If the curves representing couplers having $\Delta_{clads}$ values of 0 and 0.005 were continued in time, they would experience similar oscillations in coupled power. The relationship between coupled power and coupling length (which is a function of stretching time) over a plurality of coupled power peaks is graphically illustrated in the aforementioned U.S. Pat. No. 4,798,436.

Figure 7:
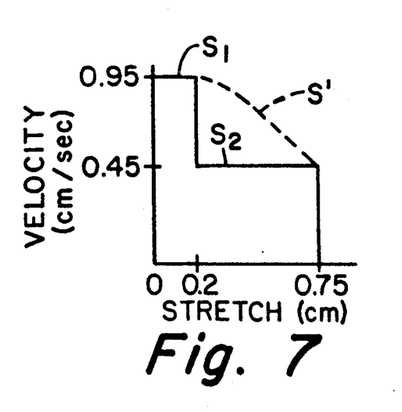
FIG. 7 is a graph illustrating non-uniform stretch rates.

It is assumed that curve t ($\Delta_{clads}=0.025\%$) is for a stretching operation wherein the coupler preform is heated once and stretched at a single rate. If all other conditions remain the same, the power transfer curve can be displaced upwardly to curve t' (toward greater power transfer) by stretching the coupler preform at more than one stretch rate as illustrated in FIG. 7. By way of example only, FIG. 7 illustrates a stretch technique involving stretching at two discrete rates (curves $s_1$ and $s_2$) and a technique wherein the stretch rate varies continually with respect to time (curve s'). In accordance with a specific embodiment depicted in FIG. 7, the coupler preform is heated and stretched 0.2 cm at a stretch rate of 0.95 cm/sec, the stretch rate abruptly decreasing to 0.45 cm/sec while the coupler preform is stretched an additional 0.55 cm.

For certain stretching conditions, including a $\Delta_{clads}$ value of about 0.025% or higher, a subsequent power transfer peak such as the third peak might be required to reach the desired coupling value, eg. 50%. Since the third peak is much narrower than the first, the stretching operation must be stopped at precisely the right time in order to achieve the desired coupling ratio. If stretching is continued for only a short additional length of time, the neckdown ratio may change sufficiently to cause the coupled power to drastically decrease. It is difficult to draw such a coupler when output power is being monitored to stop the draw, and it is almost impossible to make such a coupler by drawing to a predetermined length. Furthermore, the achromaticity becomes degraded when the coupler has to be stretched beyond the first power transfer peak. For the aforementioned reasons, the maximum preferred value of $\Delta_{clads}$ for 3 dB couplers is about 0.025% and the maximum value of $\Delta_{clads}$ for a power tap is about 0.03%.

In view of the value of $\Delta_{cores}$ that was required for the achromatic fused fiber coupler taught in the aforementioned Sweeney et al. patent, the above-defined range of $\Delta_{clads}$ that is suitable for achromatic overclad couplers is unexpectedly low. It appears that the presence of the overclad tube enables the achievement of achromaticity with relatively small values of $\Delta_{clads}$ and that a value of $\Delta_{clads}$ larger than 0.03% would be required if no overclad tube were employed, i.e. for a fused fiber coupler.

The low range of values of $\Delta_{clads}$ that was determined by the aforementioned model has been verified by experimental results. When couplers were formed having values of $\Delta_{clads}$ below about 0.005%, $\Delta\beta$ was so insignificant that coupling behavior approached that of a standard coupler. Couplers having a $\Delta_{clads}$ value in the range of about 0.015% exhibited an insertion loss of less than 4 dB in each leg thereof over a 300 nm range of wavelengths up to 1565 nm.

A number of advantages result from the unexpectedly low values of $\Delta_{clads}$. Couplers having low $\Delta_{clads}$ values can be connected with low loss into the system. One of the fibers can be a standard single-mode fiber. To provide a $\Delta_{clads}$ value of 0.015%, for example, the cladding index of the other fiber (or non-standard fiber) need differ from that of the standard fiber by only 0.00022. Such non-standard fiber exhibits substantially the same mode field diameter as the standard fiber. Since the diameters of both fibers are substantially identical, the non-standard fiber, as well as the standard fiber, can be connected to the system fibers with low loss.

It has been found that chlorine has a sufficient effect on the refractive index of silica that it can be used as a dopant in the cladding of the non-standard fiber. Since the change in refractive index per weight percent dopant in silica is much less for chlorine than for conventional dopants such as $B_2O_3$, fluorine, $GeO_2$ and the like, chlorine can be used to provide precisely controlled refractive index values that are only slightly higher than that of the silica to which the chlorine is added. Furthermore, the use of chlorine simplifies the process of making the non-standard fiber since it is conventionally employed for drying purposes. Sufficient amounts of chlorine can simply be added to the cladding region of the non-standard fiber in conjunction with the drying-/consolidation process.

The standard fiber can be made by a conventional process, such as that disclosed in U.S. Pat. No. 4,486,212, which is incorporated herein by reference. Briefly, that process consists of forming on a cylindrical mandrel a porous preform comprising a core region and a thin layer of cladding glass. The mandrel is removed, and the resultant tubular preform is gradually inserted into a consolidation furnace muffle, the maximum temperature of which is between 1200° and 1700° C. and preferably about 1490° C. for high silica content glass. The temperature profile of the muffle is highest in the central region as taught in U.S. Pat. No. 4,165,223, which is incorporated herein by reference. Chlorine, which is present in the minimum concentration that is required to achieve drying, may be supplied to the preform by flowing into the preform aperture a drying gas consisting of helium and about 5 volume percent chlorine. The end of the aperture is plugged to cause the gas to flow through the preform pores. A helium flushing gas is simultaneously flowed through the muffle.

The resultant tubular glass article is stretched in a standard draw furnace while a vacuum is applied to the aperture to form a "core rod" in which the aperture has been closed. A suitable length of the rod is supported in a lathe where particles of silica are deposited thereon. The resultant final preform is gradually inserted into the consolidation furnace where it is consolidated while a mixture of 99.5 volume percent helium and 0.5 volume percent chlorine is flowed upwardly therethrough. The resultant glass preform is drawn to form a step-index, single-mode optical fiber, the entire cladding of which comprises silica doped with a residual amount of chlorine. When the cladding is consolidated in a standard downfeed consolidation furnace, as described above, about 0.04–0.06 wt. % chlorine is normally present in the fiber cladding.

Figure 8:
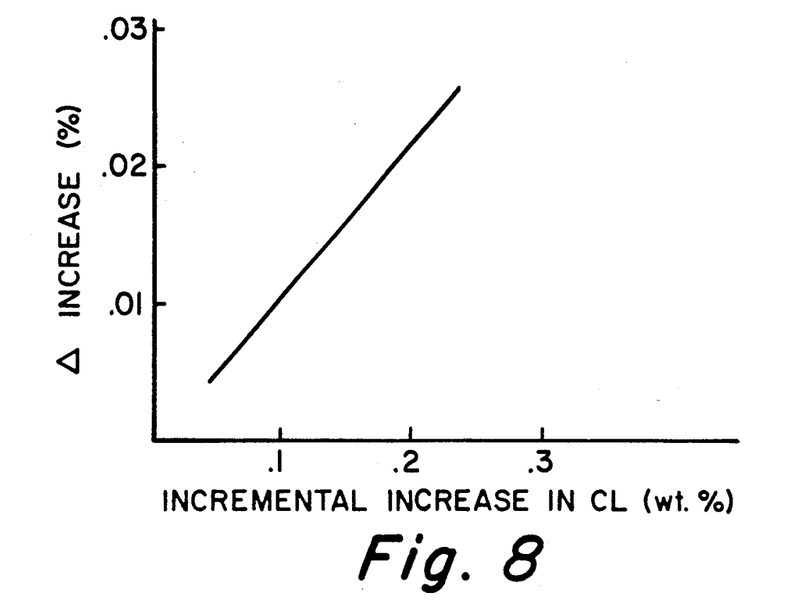
FIG. 8 is a graph illustrating the effect of chlorine on $\Delta_{clads}$.

The non-standard fiber can be made by a process which is initially identical to the process by which the standard fiber is made. For example, the core rod, which consists of a solid glass rod of core glass, that is optionally surrounded by a thin layer of silica cladding glass, is initially formed. A porous layer of silica particles is deposited on the rod, and the porous layer is consolidated in an atmosphere containing an amount of chlorine greater than that which would be necessary for drying purposes. The chlorine concentration in the consolidation furnace is controlled to provide the desired value of $\Delta_{clads}$. The amount of chlorine that is incorporated into the base glass depends upon various process conditions such as the maximum temperature and temperature profile of the consolidation furnace, the concentrations of chlorine and oxygen therein and the rate of insertion of the preform into the furnace. The porosity and composition of the preform would also affect the final chlorine concentration. A graph such as that shown in FIG. 8 can be generated for a given standard fiber. For the specific relationship shown in FIG. 8, the standard fiber cladding contained about 0.05 wt. % chlorine. Therefore, about 0.2 wt. % chlorine should be incorporated into the cladding of the non-standard fiber to achieve a $\Delta_{clads}$ value of 0.015 %. This chlorine concentration is determined by reading from the graph of FIG. 8 the incremental increase in chlorine content for the desired value of $\Delta_{clads}$ and adding 0.05 wt. %. If desired, both fibers could be of the non-standard type, i.e. both could contain more chlorine than standard, commercially available fibers. For example, a $\Delta_{clads}$ value of 0.015% could also be obtained by utilizing fibers, the claddings of which contain 0.10 wt. % and 0.23 wt. % chlorine.

Figure 9:
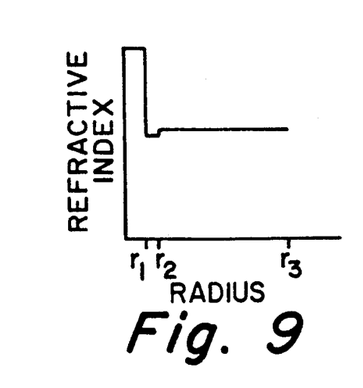
FIG. 9 is a refractive index profile of a non-standard fiber employed in the coupler of the invention.

If the non-standard fiber is made by initially forming a core rod comprising core glass surrounded by a thin layer of cladding glass (containing a small amount of residual chlorine) and the outer cladding glass is doped with a larger amount of chlorine, the refractive index profile of the resultant fiber would appear as illustrated in FIG. 9. The radii of the various layers of a standard fiber might be 4 μm core radius $r_1$, 10.5 μm inner cladding radius $r_2$ and 62.6 μm outer radius $r_3$. Because of the small area of the inner cladding layer, the refractive index of that layer need not be taken into consideration when specifying the cladding refractive index. That is, the effective refractive index of the entire cladding beyond radius $r_1$ is essentially the same as that of the layer between $r_2$ and $r_3$.

It is noted that attempts have been made by certain fiber manufacturers to reduce the amount of chlorine in optical fibers in order to lower the attenuation (see Japanese Kokai No. 63/285137). If one fiber had a pure silica cladding (by removing the chlorine therefrom) about 0.13 wt. % chlorine would be needed in the other fiber to achieve a $\Delta_{clads}$ value of 0.015%. However, it has been found that the presence of chlorine in the short lengths of coupler fibers has little or no effect on coupler loss. The additional step of removing chlorine from coupler fibers would therefore be an unnecessary expense.

Figure 10:
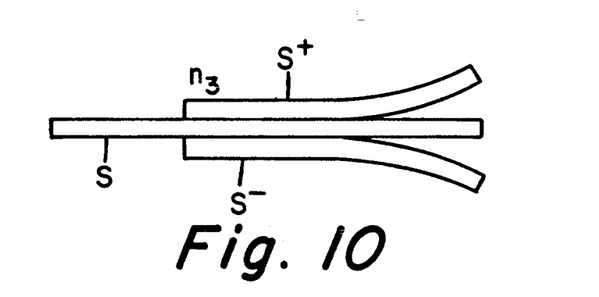
FIGS. 10-12 illustrate achromatic couplers having more than two ports at one end thereof.
Figure 11:
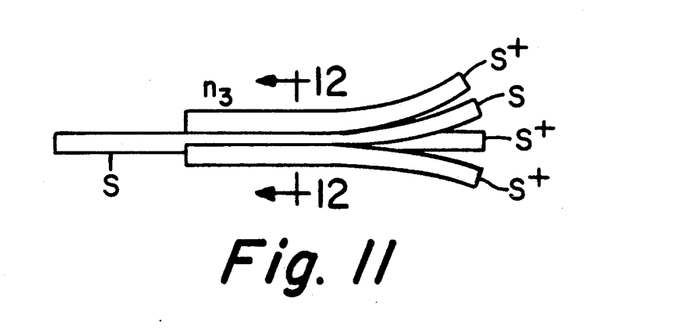
Figure 12:
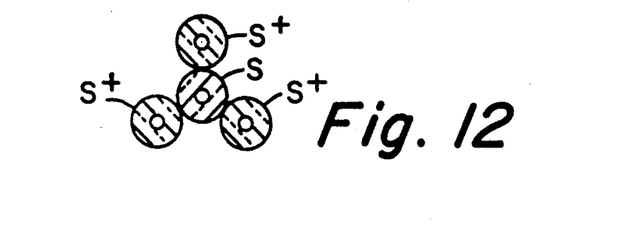

Whereas 2×2 couplers are illustrated in FIG. 1, this invention also applies to other configurations. An N×N coupler (N>1) can be formed for the purpose of coupling one fiber to N fibers. A 1×2 coupler is described in the specific embodiment. More than 2 fibers can be joined at their waists to form an N×N coupler. Sometimes, one or more fibers are severed from one end of an N×N coupler so that a plurality of fibers, unequal in number, extend from opposite ends of the coupler. The embodiments of FIGS. 10-12 are schematic illustrations of coupled fibers, the overclad tubing glass having been omitted for simplicity. The presence of an overclad glass is indicated by the symbol $n_3$ adjacent the fibers. In the 1×3 coupler of FIG. 10, standard fiber S is coupled to two non-standard fibers S+ and S− The refractive index of the cladding of fiber S+ is negative with respect to the cladding of fiber S, whereby the value of $\Delta_{clads}$ of fiber S+ with respect to fiber S is positive. The refractive index of the cladding of fiber S− is such that the value of $\Delta_{clads}$ of fiber S− with respect to fiber S is negative.

In the 1×4 embodiment of FIGS. 11 and 12, the refractive index of the cladding glass of fibers S+ is such that the value of $\Delta_{clads}$ of fibers S+ with respect to fiber S is positive. FIG. 12 shows that fibers S+ are preferable equally spaced around fiber S.

Whereas the preferred manufacturing technique results in a coupler having optical fiber pigtails extending therefrom, the invention also applies to overclad couplers of the type wherein the fibers extend through the elongated matrix glass body but end flush with the body endface Methods of making such a coupler are disclosed in U.S. Pat. Nos. 4,773,924 and 4,799,949. Briefly, the method comprises inserting a plurality of optical fiber preform rods into a glass tube, heating and stretching the resultant preform to form a glass rod which is then severed into a plurality of units. Heat is applied to the central region of each unit, and the central region is stretched to form a tapered region as described herein.

A method of making 1×2 achromatic 3 dB fiber optic couplers is illustrated in FIGS. 13-18. A glass capillary tube 10 having a 3.8 cm length, 2.8 mm outside diameter, and 270 μm longitudinal aperture diameter was secured by chucks 32 and 33 of the apparatus of FIG. 16. Tube 10, which was formed by a flame hydrolysis process, consisted of silica doped with about 6 wt. % $B_2O_3$ and about 1 wt. % fluorine. Tapered apertures 12 and 13 were formed by flowing the gas phase etchant $NF_3$ through the tube while uniformly heating the end of the tube.

Coated fibers 17 and 18 comprised 125 μm diameter single-mode optical fibers 19 and 20 having a 250 μm diameter urethane acrylate coatings 21 and 22, respectively. Both fibers had a 8 μm diameter core of silica doped with 8.5 wt. % $GeO_2$. The cutoff wavelengths of the fibers are below the operating wavelength of the coupler. If, for example, the minimum operating wavelength is 1260 nm, the cutoff wavelengths of the fibers are selected to be between 1200 nm and 1250 nm. All chlorine concentrations were measured by microprobe techniques. The initial steps of the processes of making both fibers was the same; these steps are set forth above in conjunction with a discussion of U.S. Pat. No. 4,486,212. A first layer of glass particles comprising $SiO_2$ doped with 8.5 wt. % $GeO_2$ was deposited on a mandrel, and a thin layer of $SiO_2$ particles was deposited on the first layer. The mandrel was removed, and the resultant porous preform was gradually inserted into a furnace having an alumina muffle where it was dried and consolidated. During this process, a gas mixture containing 65 sccm (standard cubic centimeter per minute) chlorine and 650 sccm helium flowed into the center hole where the mandrel had been removed. A flushing gas containing 40 lpm (liter per minute) helium and 0.5 lpm oxygen flowed upwardly from the bottom of the muffle. The aperture was evacuated, and the lower end of the tubular body was heated to 1900° C. and drawn at a rate of about 15 cm/min to form a 5 mm solid glass rod. The rod was severed to form sections, each of which was supported in a lathe where it functioned as a mandrel upon which $SiO_2$ cladding soot was deposited to form a final porous preform.

a. Forming a Standard Fiber

One final porous preform was gradually inserted into the alumina muffle of a consolidation furnace having a maximum temperature of 1490° C. A gas mixture containing 40 lpm helium, 0.5 lpm chlorine and 0.5 lpm oxygen flowed through the muffle. The porous preform was consolidated to form a draw blank, the outer cladding of which had the same composition as the inner cladding layer, i.e. $SiO_2$ doped with about 0.05 wt. % chlorine. The tip of the draw blank was heated to about 2100° C., and a standard optical fiber was drawn therefrom, the fiber being coated during drawing. The fiber had an 8 μm diameter core and a 125 μm diameter homogeneous cladding layer of silica containing about 0.05 wt. % chlorine as a residual from the drying process.

b. Forming a Non-Standard Fiber

Another final porous preform was gradually inserted into a consolidation furnace having a sileca muffle. The maximum temperature of 1450° C. The porous preform was subjected to an upwardly flowing gas mixture containing about 2 lpm helium and 0.6 lpm chlorine. The porous preform was consolidated to form a draw blank, the outer cladding of which consisted of $SiO_2$ doped with about 0.2 wt. % chlorine. The resultant non-standard fiber was similar to the standard fiber except that it had a 10.5 μm diameter inner cladding region containing about 0.05 wt. % chlorine and an outer, 125 μm diameter cladding region containing about 0.2 wt. % chlorine. The refractive indices of the claddings of this fiber and the standard fiber were such that the value of $\Delta_{clads}$ was 0.015.

The standard and non-standard fibers were interchangable in the following process.

Figure 14:
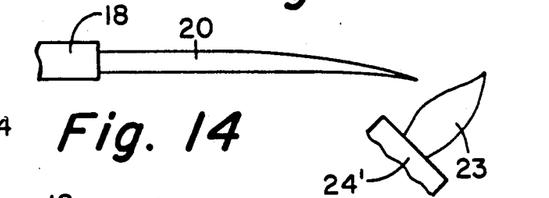
FIGS. 14 and 15 are schematic illustrations of two steps during the formation of an antireflection termination on a fiber.
Figure 15:
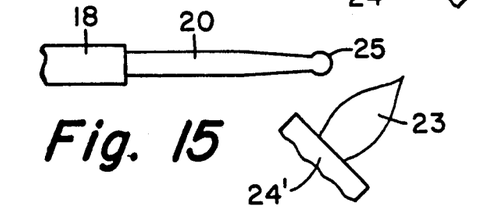
Figure 16:
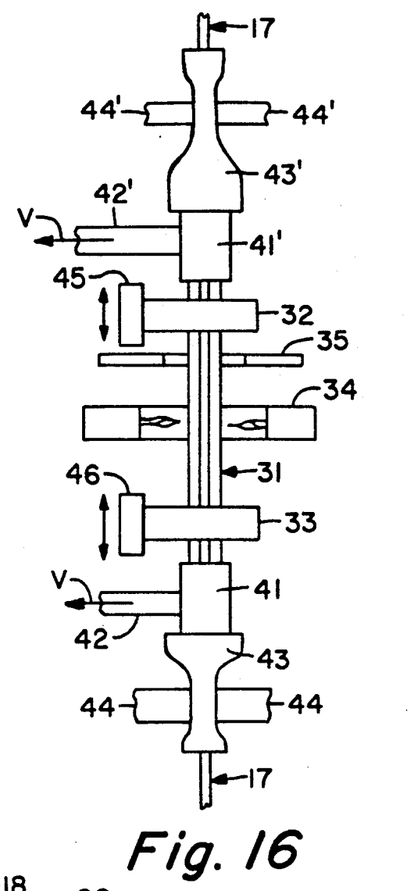
FIG. 16 is a schematic illustration of an apparatus for collapsing a capillary tube and stretching the midregion thereof.

A 6 cm long section of coating was removed from the end of a 1.5 meter length of coated fiber 18. A flame was directed at the center of the stripped region of fiber, and the end of the fiber was pulled and severed to form a tapered end (FIG. 14). The fiber end remote from the tapered end was connected to a reflectance monitoring apparatus. The tapered end was moved slowly along its longitudinal axis to the right (as shown in FIGS. 14 and 15 wherein only the bright, central portion 23 of the flame is illustrated). As the tip of fiber 20 was heated by flame 23 of burner 24', the glass receded and formed rounded endface 25 (FIG. 15), the diameter of which was preferably equal to or slightly smaller than the original uncoated fiber diameter. A current specification for the reflected power is −50 dB. The resultant length of uncoated fiber was about 2.9 cm.

Tube 10 was inserted through ring burner 34 (FIG. 16) and was clamped to draw chucks 32 and 33. The chucks were mounted on motor controlled stages 45 and 46 which were controlled by a computer. Approximately 3.2 cm of coating was stripped from the central region of a 3 meter length of fiber 17. The uncoated sections of fibers 17 and 18 were wiped, and a small amount of ethyl alcohol was squirted into the tube to temporarily lubricate the fibers during the insertion process.

Figure 13:
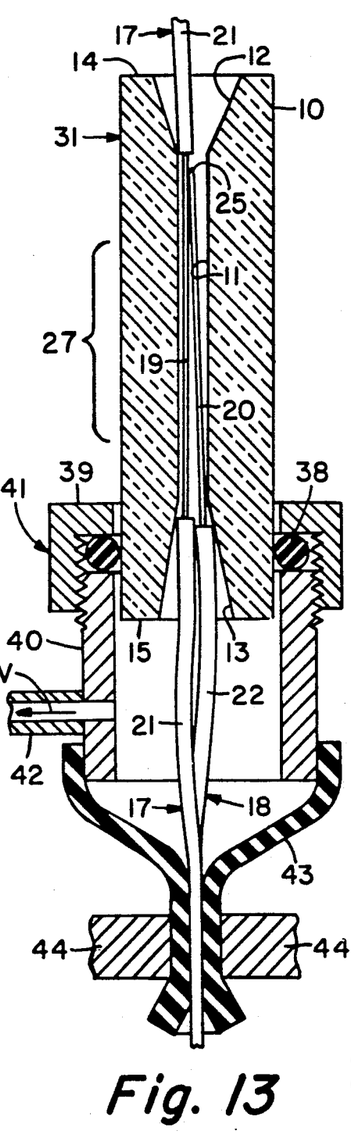
FIG. 13 is a cross-sectional view of a capillary tube after optical fibers have been inserted therein.

Coated fiber 17 was inserted through aperture 11 until its uncoated portion was situated below tube end 15. The uncoated portion of coated fiber 18 was held adjacent the uncoated portion of coated fiber 17, and both were moved together toward tube end 14 until the coating end regions become wedged in tapered aperture 13. The uncoated portion of coated fiber 17 was then disposed intermediate end surfaces 14 and 15, the uncoated portion of coated fiber 17 preferably being centered within aperture 11. End 25 of fiber 18 was located between midregion 27 and end 14 of tube 10. The fibers were threaded through the vacuum attachments 41 and 41', which were then attached to the ends of preform 31. Referring to FIG. 13, vacuum attachment 41 was slid over the end of tube 10, and collar 39 was tightened, thereby compressing O-ring 38 against the tube. Vacuum line 42 was connected to tube 40. One end of a length of thin rubber tubing 43 was attached to that end of vacuum attachment 41 opposite preform 31; the remaining end of the tubing extending between clamp jaws 44. Upper vacuum attachment 41' was similarly associated with line 42', tubing 43' and clamp jaws 44'. The coated portions of the fibers extended from tubing 43 and 43'.

Vacuum was applied to the lower portion of coupler preform 31 by clamping jaws 44 on tubing 43 while the upper vacuum attachment was connected to a source of nitrogen to purge the aperture contents. Jaws 44' were then clamped against tubing 43' to apply vacuum to the upper portion of preform 31.

The upper end of fiber 17 was connected to a monochromater coupled to a white light source. The monochromater was adjusted so that the fiber was provided with a beam 1310 nm light. The lower end of fiber 17 was connected to a detector which formed a part of the system that controls the movement of chucks 32 and 33.

Figure 17:
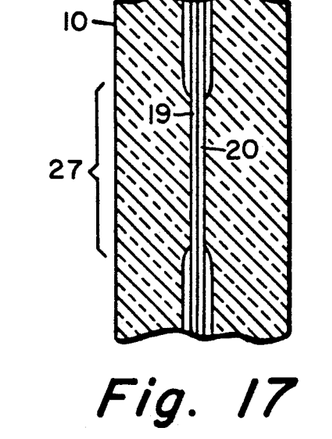
FIG. 17 is a partial cross-sectional view illustrating the collapse of the glass tube around the fibers to form a solid midregion.
Figure 18:
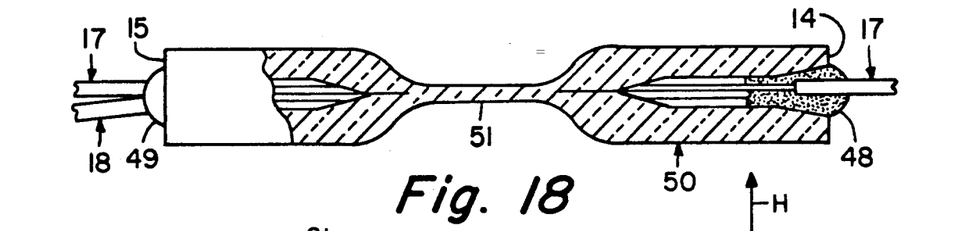
FIG. 18 is a partial cross-sectional illustration of a fiber optic coupler after it has been drawn down and sealed at its ends.

With a vacuum of 10 inches (25.4 cm) of mercury connected to the tube aperture, ring burner 34 was ignited. The apparatus located above ring burner 34 was protected by heat shield 35. Flames of about 1800° C. were generated by supplying gas and oxygen to the burner at rates of 0.8 slpm and 0.85 slpm, respectively. The flame from ring burner 34 heated tube 10 for about 25 seconds. The matrix glass collapsed onto fibers 19 and 20 as shown in FIG. 17. Midregion 27, the central portion of which forms the coupling region of the resultant coupler, became a solid region wherein substantially the entire lengths of fibers 19 and 20 were in mutual contact.

After the tube cooled, the flow rates of both the gas and oxygen were increased to 0.9 slpm, and the burner was reignited. Flames having a temperature of about 1900° C. heated the center of the collapsed region to the softening point of the materials thereof. After 12 seconds, the supply of oxygen to burner 34 was turned off, at which time the flame begins to defocus. Stages 45 and 46 were pulled in opposite directions at a combined rate of 2.5 cm/sec until the central portion of midregion 27 was stretched 1.46 cm. The flame became extinguished after the stretching operation. This increase in length was just short of the length to which coupler preform 31 would have had to be stretched in order to have achieved achromaticity in a single stretching operation. A sufficient amount of power began to couple to fiber 18 to enable the end of that fiber to be connected to a detector, and the power output to the detector was peaked.

Flow rates of gas and oxygen to burner 34 were then adjusted to 0.65 slpm and 0.6 slpm, respectively, to produce a broader flame having a temperature of about 1650° C. Twelve seconds after the flame was ignited, the oxygen flow was turned off, and stages 45 and 46 pulled in opposite directions at a combined rate of 0.5 cm/sec to further increase the length of coupler preform 31 by about 0.02 cm. During this step, the light emanating from fibers 17 and 18 was monitored at 1310 nm. The stretching operation automatically stopped when the ratio of the optical power from fiber 17 to that of fiber 18 was 1.2, at which time the control system instructs the stages to stop moving. Because of system momentum, a sufficient amount of stretching continues to occur to provide a power ratio of 1, whereby equal light power emanated from fibers 17 and 18 at 1310 nm. The diameter of the midregion is reduced by the stretching operations as illustrated by region 51 of FIG. 18.

After the coupler had cooled, the vacuum lines were removed from the resultant coupler, and a drops 48 and 49 of heat curable adhesive were applied from a syringe to ends 14 and 15, respectively, of the capillary tube. After the adhesive was cured by exposure to heat (arrow H), the coupler was removed from the draw.

The resultant devices couple approximately 50% of the signal propagating in that end of optical fiber 17 at end 14 to optical fiber 18 at about 1310 nm and 1490 nm; the power slope at 1310 nm is 0.077% per nm or 0.006 dB per nm. These couplers exhibited a median excess device loss of about 0.3 dB. The lowest measured excess loss was 0.05 dB.

Figure 19:
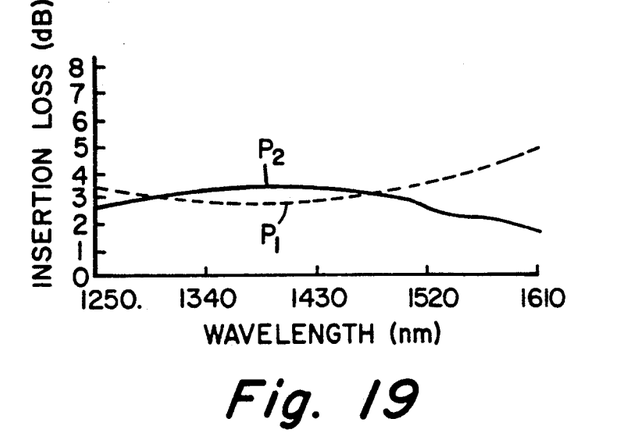
FIG. 19 is a graph illustrating the spectral insertion loss curves for an achromatic coupler produced by the method of the specific example.

The spectral insertion loss curves for a specific coupler made in accordance with the specific example are shown in FIG. 19. Curve $P_2$ represents the coupled power. The excess loss for that coupler was 0.09 dB and 0.05 dB at 1310 nm and 1550 nm, respectively. The insertion loss was less than 4 dB in each leg of that coupler over a 300 nm range of wavelengths up to about 1565 nm.

Figure 20:
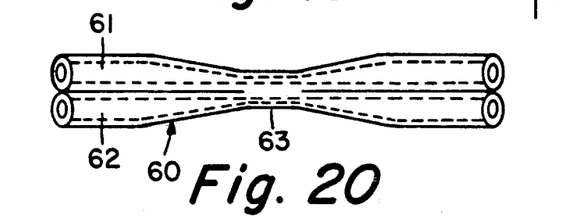
FIG. 20 illustrates a fused fiber coupler.

The use of fibers having chlorine-doped claddings is not limited to overclad couplers or to achromatic couplers. Chlorine doped cladding can be employed to provide the entire $\Delta \beta$ or a portion of the $\Delta \beta$ that is necessary for a given spectral response such as wavelength division multiplexing, achromaticity, and the like. The cladding of one or more of the fibers 61 and 62 of fused fiber coupler 60 of FIG. 20 can be doped with chlorine to provide the desired value of $\Delta_{clads}$. Fibers 60 and 61 are disposed in side-by-side relation and are heated to thermally fuse them together along a predetermined length. The fused region, wherein the cores of the fibers are disposed within a common cladding region of oblong cross-section, can be stretched to form a neckdown region 63 wherein the cores are relatively closely spaced. In accordance with the aforementioned Parriaux et al. publication, one or more other parameters, e.g. core refractive index and/or diameter, of fiber 62 can also be made different from the corresponding parameter of fiber 61.

Figure 21:
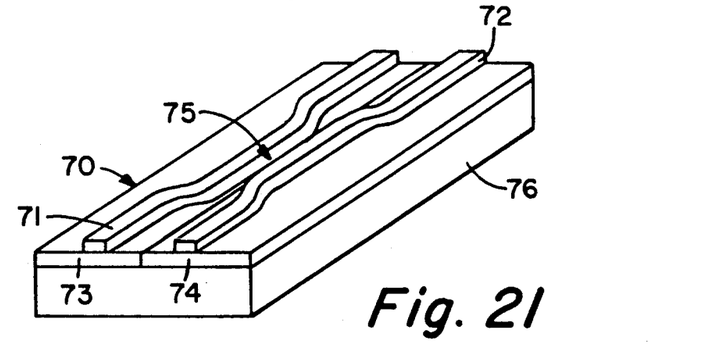
FIG. 21 is an oblique view of a planar coupler.

The passive optical component shown in FIG. 21 is a planar device 70 having first and second adjacent optical waveguide paths. One of the paths includes light propagation region 71 and the adjacent surface region 73; the other includes light propagation region 72 and the adjacent surface region 74. The refractive indices of regions 73 and 74 are lower than that of light propagation regions 71 and 72. Disposed over regions 71 and 72 is a substance such as air, glass (not shown) or the like, the refractive index of which is lower than that of regions 71 and 72. Light propagating regions 71 and 72 are more closely spaced for a sufficiently long distance in coupling region 75 for coupling to occur. In accordance with the invention, at least one of the regions 73 and 74 contains an amount of chlorine sufficient to alter the optical performance of device 70. If both of the regions 73 and 74 contain chlorine, then the chlorine concentration in region 74 must be greater than the chlorine concentration in region 73, the difference in chlorine concentrations being sufficient to increase the refractive index of region 74 to a value greater than the refractive index of region 73. The difference in refractive indices between regions 73 and 74 is at least partially responsible for a difference in propagation constants between the first and second optical waveguide paths.

Device 70 can be formed by photolithographic techniques in accordance with the following theoretical example. A mask is formed over that portion of substrate 76 that is to be occupied by region 74. Particles of a glass such as silica are deposited on the exposed surface portion of substrate 76 as well as on the mask. The mask is removed, and the particles are consolidated in a chlorine-free atmosphere to form region 73. A second mask is then formed on the surface of region 73, and glass particles are deposited on the exposed surface portion of substrate 76 as well as on the second mask. The second mask is removed, and the particles are consolidated in a chlorine-containing atmosphere to form region 74. The glass particles can be deposited and consolidated in accordance with the teachings of U.S. Pat. Nos. 3,806,223 and 3,873,339, which are hereby incorporated by reference. Light propagation regions 71 and 72 can be formed by any known technique. If water is to be removed from both of the regions 73 and 74, both can be consolidated in a chlorine-containing atmosphere, the chlorine concentration being greater during the consolidation of region 74.

I claim:

1. A fiber optic coupler comprising at least first and second optical fibers, each having a core and a cladding, said fibers being fused together along a portion of the lengths thereof to form a coupling region, most of the cross-sectional areas of the claddings of said first and second fibers containing chlorine, the cladding of said second fiber having a chlorine concentration greater than that of said first fiber cladding, the difference in chlorine concentration int he claddings of said first and second fibers being sufficient to increase the refractive index $n'_2$ of said second fiber cladding to a value greater than the refractive index $n_2$ of the cladding of said first fiber.

2. A fiber optic coupler in accordance with claim 1 wherein the cladding of said first fiber contains at least 0.04 wt. % chlorine.

3. A fiber optic coupler in accordance with claim 1 wherein, except for the difference in concentrations of chlorine in the claddings of said first and second fibers, said fibers are identical.

4. A fiber optic coupler in accordance with claim 1 wherein said coupling region is surrounded by matrix glass having a refractive index $n_3$ that is lower than the refractive indices of said claddings.

5. A fiber optic coupler in accordance with claim 1 wherein more than 99% of he cross-sectional area of the cladding of said second fiber contains chlorine.

6. A fiber optic coupler comprising
an elongated body of matrix glass having a refractive index $n_3$, said body having two opposed endfaces and a midregion,
at least first and second optical fibers extending longitudinally through said elongated body, each of said fibers comprising a core surrounded by a cladding of refractive index less than that of said core but greater than $n_3$, most of the cross-sectional area of the cladding of said second fiber containing an amount of chlorine sufficient to increase the refractive index $n'_2$ thereof to a value greater than the refractive index $n_2$ of the cladding of said first fiber,
said fibers being fused together along with the midregion of said matrix glass, the cores of said optical fibers being more closely spaced at the central portion of said midregion than at said endfaces, thereby forming a coupling region wherein optical power couples between said fibers.

7. A fiber optic coupler in accordance with claim 6 wherein the cladding of said first fiber is free from chlorine.

8. A fiber optic coupler in accordance with claim 6 wherein the claddings of said first and second fibers contain chlorine.

9. A fiber optic coupler in accordance with claim 8 wherein the cladding of said first fiber contains at least 0.04 wt. % chlorine.

10. A fiber optic coupler in accordance with claim 6 wherein, other than the difference in concentrations of chlorine in the claddings of said first and second fibers, said fibers are identical.

11. A fiber optic coupler in accordance with claim 6 wherein the difference between the chlorine concentrations in the claddings of said first and second fibers is such that the insertion loss is less than 4 dB in each leg thereof over a band of wavelengths that is at least 300 nm wide.

12. A fiber optic coupler in accordance with claim 6 wherein more than 99% of the cross-sectional area of the cladding of said second fiber contains chlorine.

13. A method of making a fiber optic coupler comprising the steps of
providing at least two glass optical fibers, each of said fibers comprising a core surrounded by a cladding having a refractive index lower than that of said core, the cladding of a second of said fibers containing an amount of chlorine sufficient to increase the refractive index $n'_2$ thereof to a value greater than the refractive index $n_2$ of the cladding of a first of said fibers,
disposing portions of said fibers in side-by-side relationship, and
heating said fibers over predetermined portions thereof to cause said predetermined portions to fuse together into a unitary region.

14. A method in accordance with claim 13 further comprising the step of applying axial tension to said fused unitary region to form an elongated coupling region of reduced diameter.

15. A method in accordance with claim 14 wherein the step of disposing comprises inserting said portions into the aperture of a glass tube having a refractive index lower than that of the claddings of said fibers, and wherein the step of heating results in the collapse of said tube onto said fibers.

16. A method in accordance with claim 14 wherein the step of providing said second fiber comprises providing a glass rod, depositing a coating of glass particles on said rod, subjecting said coating to an atmosphere containing chlorine, consolidating said coating on said rod to form a draw blank, and drawing a fiber from said blank.

17. A method in accordance with claim 14 wherein the step of providing said first fiber comprises providing a first glass rod, depositing a first coating of glass particles on said first rod, subjecting said first coating of particles to an atmosphere containing an amount of chlorine sufficient to dry said first coating, consolidating said first coating on said rod to form a first draw blank, and drawing said first fiber from said blank.

18. A method in accordance with claim 14 wherein the step of providing said first fiber comprises providing a first glass rod, depositing a first coating of glass particles on said first rod, subjecting said first coating of particles to an atmosphere containing a given concentration of chlorine that is sufficient to dry said first coating, consolidating said first coating on said rod to form a first draw blank, and drawing said first fiber from said first blank, and wherein the step of providing said second fiber comprises providing a second glass rod, depositing a second coating of glass particles on said second rod, subjecting said second coating of particles to an atmosphere containing a concentration of chlorine that is greater than said given concentration, consolidating said second coating on said rod to form a second draw blank, and drawing said second fiber from said blank.

19. A method in accordance with claim 18 wherein the step of subjecting said first coating of particles to an atmosphere comprises subjecting said first coating to an atmosphere containing an amount chlorine sufficient to provide the cladding of said first fiber with a chlorine concentration of at least 0.04 wt. %.

20. A method of making an achromatic fiber optic coupler comprising the steps of
inserting into a glass tube of refractive index $n_3$ a portion of each of a plurality of optical fibers so that said portions occupy the midregion of said tube, each of said fibers comprising a core of refractive index $n_1$ and a cladding of refractive index less than $n_1$ but greater than $n_3$, the cladding of a second of said fibers containing an amount of chlorine sufficient to increase the refractive index $n'_2$ thereof to a value greater than the refractive index $n_2$ of the cladding of a first of said fibers, the difference between $n_2$ and $n_2'$ being such that the value of $\Delta_{clads}$ is greater than zero but less than 0.03%, wherein $\Delta_{clads}$ equals $(n_2^2 - n_2'^2)/2n_2^2$,
collapsing the midregion of said tube onto fibers, and stretching the central portion of said midregion.

21. A method in accordance with claim 20 wherein the step of inserting a portion of said first fiber into said tube comprises inserting a portion of a fiber, the cladding of which is free from chlorine.

22. A method in accordance with claim 20 wherein the step of inserting a portion of said first fiber into said tube comprises inserting a portion of a fiber, the cladding of which contains chlorine.

23. A method in accordance with claim 20 wherein the step of inserting a portion of said first fiber into said tube comprises inserting a portion of a fiber, the cladding of which contains at least 0.04 wt. % chlorine.

24. A method in accordance with claim 20 wherein the step of inserting a portion of said fibers into said tube comprises inserting portions of fibers that are identical except for the difference in concentrations of chlorine in the claddings thereof.

25. A method in accordance with claim 20 wherein the step of inserting a portion of said second fiber into said tube comprises inserting a portion of a fiber, the cladding of which contains an amount of chlorine sufficient to increase the refractive index $n'_2$ thereof to a value greater than $n_2$ by such an extent that the difference between $n_2$ and $n'_2$ is such that the insertion loss is less than 4 dB in each leg thereof over a 300 nm wavelength range.

26. A method in accordance with claim 20 wherein the step of providing said second fiber comprises providing a glass rod, depositing a coating of glass particles on said rod, subjecting said coating to an atmosphere containing chlorine, consolidating said coating on said rod to form a draw blank, and drawing a fiber from said blank.

27. A method in accordance with claim 20 wherein the step of providing said first fiber comprises providing a first glass rod, depositing a first coating of glass particles on said first rod, subjecting said first coating of particles to an atmosphere containing an amount of chlorine sufficient to dry said first coating, consolidating said first coating on said rod to form a first draw blank, and drawing said first fiber from said blank.

28. A method in accordance with claim 20 wherein the step of providing said first fiber comprises providing a first glass rod, depositing a first coating of glass particles on said first rod, subjecting said first coating of particles to an atmosphere containing a given concentration of chlorine that is sufficient to dry said first coating, consolidating said first coating on said rod to form a first draw blank, and drawing said first fiber from said first blank, and wherein the step of providing said second fiber comprises providing a second glass rod, depositing a second coating of glass particles on said second rod, subjecting said second coating of particles to an atmosphere containing a concentration of chlorine that is greater than said given concentration, consolidating said second coating on said rod to form a second draw blank, and drawing said second fiber from said blank.

29. A method in accordance with claim 28 wherein the step of subjecting said first coating of particles to an atmosphere comprises subjecting said first coating to an atmosphere containing an amount chlorine sufficient to provide the cladding of said first fiber with a chlorine concentration of at least 0.04 wt. %.

30. A fiber optic coupler comprising at least first and second optical fibers, each having a core and a cladding, said fibers being fused together along a portion of the lengths thereof to form a coupling region, the cladding of said second fiber containing an amount of chlorine sufficient to increase the refractive index $n'_2$ thereof to a value greater than the refractive index $n_2$ f the cladding of said first fiber, the difference between the chlorine concentrations in the claddings of said firs and second fibers being such that the insertion loss is less than 4 dB in each leg thereof over a band of wavelengths that is at least 300 nm wide.

* * * * *